(12) United States Patent
Takanashi et al.

(10) Patent No.: US 11,960,038 B2
(45) Date of Patent: Apr. 16, 2024

(54) RADIATION DOSIMETRY GEL AND RADIATION DOSIMETER COMPRISING SAME AS MATERIAL FOR MEASURING RADIATION DOSE

(71) Applicants: RIKEN, Wako (JP); NISSAN CHEMICAL CORPORATION, Tokyo (JP)

(72) Inventors: Takaoki Takanashi, Wako (JP); Daniel Antonio Sahade, Funabashi (JP); Toshimasa Hamada, Tokyo (JP)

(73) Assignees: RIKEN, Wako (JP); NISSAN CHEMICAL CORPORATION, Tokyo (JP)

( * ) Notice: Subject to any disclaimer, the term of this patent is extended or adjusted under 35 U.S.C. 154(b) by 324 days.

(21) Appl. No.: 17/614,254

(22) PCT Filed: May 18, 2020

(86) PCT No.: PCT/JP2020/019641
§ 371 (c)(1),
(2) Date: Nov. 24, 2021

(87) PCT Pub. No.: WO2020/241354
PCT Pub. Date: Dec. 3, 2020

(65) Prior Publication Data
US 2022/0221594 A1    Jul. 14, 2022

(30) Foreign Application Priority Data

May 24, 2019  (JP) .................................. 2019-097794

(51) Int. Cl.
*G01T 1/24* (2006.01)
*C08F 2/54* (2006.01)
(Continued)

(52) U.S. Cl.
CPC .................. *G01T 1/04* (2013.01); *C08F 2/54* (2013.01); *C08F 20/06* (2013.01); *C08J 3/075* (2013.01); *C08K 3/34* (2013.01)

(58) Field of Classification Search
CPC .................................. C08K 3/32; C08L 39/00
See application file for complete search history.

(56) References Cited

FOREIGN PATENT DOCUMENTS

| JP | H09-511055 A | 11/1997 |
|---|---|---|
| JP | 2012-002669 A | 1/2012 |

(Continued)

OTHER PUBLICATIONS

Y. D. Deene, "Radiation dosimetry by use of radiosensitive hydrogels and polymers: mechanisms, state-of-the-art and perspective from 3D to 4D", Gels, vol. 8, No. 599, 54 pages. (Year: 2022).*

(Continued)

*Primary Examiner* — Kiho Kim

(57) ABSTRACT

A radiation dosimetry gel, usable in a polymer gel dosimeter having an improved sensitivity and high safety, includes a gelator, and a compound of the following Formula (1):

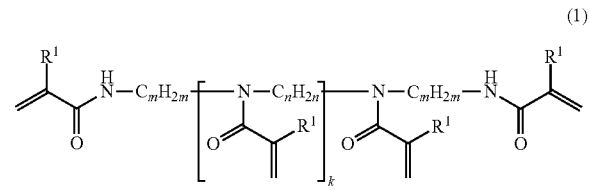

(1)

wherein $R^1$ is a hydrogen atom or a methyl group, m and n are each an integer of 2 to 4, k is 0 or 1, and a plurality of $R^1$s and ms are each the same as or different from one (Continued)

another. Also provided for is a radiation dosimeter including the radiation dosimetry gel as a material for radiation dosimetry.

12 Claims, 1 Drawing Sheet

(51) Int. Cl.
*C08F 20/06* (2006.01)
*C08J 3/075* (2006.01)
*C08K 3/34* (2006.01)
*G01T 1/04* (2006.01)

(56) References Cited

FOREIGN PATENT DOCUMENTS

| JP | 5590526 | B2 | 9/2014 |
|---|---|---|---|
| JP | 2014-185969 | A | 10/2014 |
| JP | 2014-209093 | A | 11/2014 |
| WO | 2016/098888 | A1 | 6/2016 |
| WO | 2017/221903 | A1 | 12/2017 |
| WO | 2018/134374 | A2 | 7/2018 |
| WO | 2019/069853 | A1 | 4/2019 |

OTHER PUBLICATIONS

Aug. 4, 2020 Written Opinion issued in International Patent Application No. PCT/JP2020/019641.
Sakai, Kazuyuki et al., "Imaging the nano-structure of soft and wet materials with new type of DLS methods", Proceedings of SPIE, vol. 9802, 98020S-1-98020S-6, 2016.
"Aquajoint Polymer Gel Dosimeter", Proceedings of 4th Three-Dimensional Gel Dosimeter Research Meeting, 2015.
Aug. 4, 2020 International Search Report issued in International Patent Application No. PCT/JP2020/019641.

* cited by examiner

RADIATION DOSIMETRY GEL AND RADIATION DOSIMETER COMPRISING SAME AS MATERIAL FOR MEASURING RADIATION DOSE

TECHNICAL FIELD

The present invention relates to a radiation dosimetry gel, and a radiation dosimeter containing the radiation dosimetry gel as a material for radiation dosimetry. More particularly, the present invention relates to a radiation dosimetry gel used for measurement of a three-dimensional dose distribution based on white turbidity, and a radiation dosimeter containing the gel as a material for radiation dosimetry.

BACKGROUND ART

Radiation therapies for cancer that are being introduced include high-precision therapies, such as stereotactic radiation therapy (SRT); i.e., pinpoint radiation therapy, and intensity modulated particle therapy (IMPT), which can achieve three-dimensional setting of an irradiation field along the contour of a cancer by changing a dose intensity in the same irradiation field. In such a therapy, the integrated value (i.e., dose distribution) of the amount of microscopic energy applied to each three-dimensional position of the target is precisely adjusted. A particle beam therapy has also been performed which utilizes charged particle beams with high dose concentration, such as proton beams or heavy particle beams (e.g., carbon beams or neon beams). The particle beam therapy is advantageous in that a tumor can be treated through control of the position of radiation exposure and the dose of radiation with higher accuracy than a conventional X-ray therapy. The particle beam therapy is required to properly release energy from particle beams at the position of a target (e.g., a lesion in a living tissue) and also to have as little effect as possible on a normal tissue around the target. For these purposes, the radial spread of particle beams and the position of the Bragg peaks of particle beams are aligned with respect to the target position in the irradiated body.

In a practical radiation therapy regimen, the dose distribution is optimized at each three-dimensional position in a living tissue. In a typical therapy regimen, the dose distribution (radiation doses to each position) in the target tissue is varied in accordance with the purpose of the therapy, as well as the influence of the radiation on the surrounding normal tissues is reduced, and the influence of the radiation on an organ at risk is also reduced to a minimum possible level. In order to achieve such a complicated dose distribution, beams may be precisely controlled and irradiated from multiple directions. This control is performed with a filter or a collimator (e.g., a range shifter, a multi-leaf collimator, or a bolus collimator) that are adjusted in accordance with the irradiated body. In order to realize highly controlled radiation therapy, advanced quality assurance and quality control (hereinafter abbreviated as "QA/QC") are required for the entire device including a radiation exposure device, an auxiliary, a filter, a collimator, etc., and for the irradiation process by such a device.

Such a therapy regimen and the QA/QC of various devices require a technique capable of appropriately integrating and actually measuring the amount of energy applied by a large amount of ionizing radiations incident from different directions at various acceleration energies. This is because, if the amount of energy applied can be integrated and the dose can be measured accurately at each position, the three-dimensional distribution of the amount of energy applied (dose distribution), which supports the aforementioned QA/QC, can be measured. For this purpose, a one-dimensional or two-dimensional dosimeter, such as an ionization chamber dosimeter, a semiconductor detector, or a film, has conventionally been used. In such a dosimeter, the aforementioned dose distribution with respect to one-dimensional or two-dimensional coordinates is actually measured in the region where particle beams are aligned with the target position. In recent years, besides these dosimeters, attention has been paid to a gel dosimeter capable of measuring a three-dimensional dose distribution by a gel utilizing the measurement principle of a chemical dosimeter. The use of a gel dosimeter is advantageous in that the amount of energy applied by radiation at each position of water (i.e., a material that can be regarded as equivalent to a living organism) can be accurately measured; i.e., the influence of radiation can be measured in a bioequivalent material or a water-equivalent material. The gel dosimeter can acquire a three-dimensional dose distribution while the dosimeter itself is used as a solid phantom.

Hitherto reported gel dosimeters capable of measuring a three-dimensional dose distribution include a Fricke gel dosimeter (Patent Document 1) and a polymer gel dosimeter (Patent Documents 2 and 3 and Non-Patent Document 1). A Fricke gel dosimeter is composed of a gel containing a solution (an aqueous solution containing ferrous sulfate) of a Fricke dosimeter known as a liquid chemical dosimeter, and utilizes absorbed-dose-proportional enhancement of oxidation reaction (from divalent to trivalent) of iron (coloring) in association with radiation exposure. Meanwhile, a polymer gel dosimeter is prepared by dispersion of a monomer in a gel, and utilizes dose-proportional production of a polymer upon radiation exposure. Thus, the dose can be estimated through determination of the amount of the produced polymer (white turbidity). The produced polymer is less likely to diffuse in the gel, and the white turbidity remains stable over time. In addition, white turbid portions seem to float in the transparent gel. Therefore, the polymer gel dosimeter is characterized by its superior visuality.

PRIOR ART DOCUMENTS

Patent Documents

Patent Document 1: JP 2014-209093 A
Patent Document 2: JP 5590526 B
Patent Document 3: JP 2014-185969 A Non-Patent Documents Non-Patent Document 1: "AQUAJOINT Polymer Gel Dosimeter" in Proceedings of 4th Three-Dimensional Gel Dosimeter Research Meeting (2015)

SUMMARY OF THE INVENTION

Problems to be Solved by the Invention

A conventional polymer gel dosimeter contains a water-soluble polymerizable monomer (e.g., acrylamide or N-vinyl-2-pyrrolidone) and a polymerizable crosslinking agent (e.g., N,N'-methylenebisacrylamide), wherein an insoluble three-dimensional network structure is formed by radical polymerization through radiation exposure. However, such a polymer gel dosimeter is less sensitive to radiation exposure and has a problem in terms of the safety of the monomer or the crosslinking agent. Thus, a demand has arisen for a polymer gel dosimeter exhibiting higher sensitivity and high safety.

Means for Solving the Problems

The present inventors have conducted extensive studies on a polymer gel dosimeter exhibiting high sensitivity and high safety, and as a result have found that a polymer gel dosimeter containing, as a crosslinking agent, a polyfunctional acrylamide derivative of the following Formula (1) exhibits excellent sensitivity to radiation exposure. The present invention has been accomplished on the basis of this finding.

Accordingly, a first aspect of the present invention is a radiation dosimetry gel comprising a gelator, and a compound of the following Formula (1):

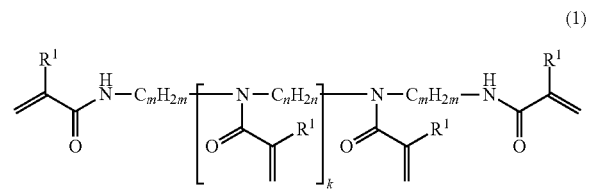

(wherein $R^1$ is a hydrogen atom or a methyl group;
m and n are each an integer of 2 to 4;
k is 0 or 1; and
a plurality of $R^1$s and ms may be each the same as or different from one another).

A second aspect of the present invention is the radiation dosimetry gel according to the first aspect, wherein the radiation dosimetry gel further comprises water.

A third aspect of the present invention is the radiation dosimetry gel according to the first or second aspect, wherein the gelator is one or more selected from the group consisting of gelatin, agarose, xanthan gum, carrageenan, gellan gum, chitosan, and alginic acid.

A fourth aspect of the present invention is the radiation dosimetry gel according to the first or second aspect, wherein the gelator contains a water-soluble organic polymer (A) having an organic acid structure, an organic acid salt structure, or an organic acid anion structure, a silicate salt (B), and a dispersant (C) for the silicate salt.

A fifth aspect of the present invention is the radiation dosimetry gel according to the fourth aspect, wherein the water-soluble organic polymer (A) is a completely neutralized or partially neutralized polyacrylic acid salt having a weight average molecular weight of 1,000,000 to 10,000,000.

A sixth aspect of the present invention is the radiation dosimetry gel according to the fourth or fifth aspect, wherein the silicate salt (B) is particles of one or more water-swellable silicate salts selected from the group consisting of smectite, bentonite, vermiculite, and mica.

A seventh aspect of the present invention is the radiation dosimetry gel according to any one of the fourth to sixth aspects, wherein the dispersant (C) is one or more selected from the group consisting of sodium orthophosphate, sodium pyrophosphate, sodium tripolyphosphate, sodium tetraphosphate, sodium hexametaphosphate, sodium polyphosphate, sodium etidronate, sodium poly(meth)acrylate, ammonium poly(meth)acrylate, a sodium acrylate/sodium maleate copolymer, an ammonium acrylate/ammonium maleate copolymer, sodium hydroxide, hydroxylamine, sodium carbonate, sodium silicate, polyethylene glycol, polypropylene glycol, sodium humate, and sodium ligninsulfonate.

An eighth aspect of the present invention is the radiation dosimetry gel according to any one of the first to seventh aspects, wherein the radiation dosimetry gel further comprises a monomer capable of being polymerized by radiation exposure.

A ninth aspect of the present invention is the radiation dosimetry gel according to any one of the first to eighth aspects, wherein the radiation dosimetry gel further comprises a deoxidizer.

A tenth aspect of the present invention is a radiation dosimeter comprising, as a material for radiation dosimetry, the radiation dosimetry gel according to any one of the first to ninth aspects.

An eleventh aspect of the present invention is a radiation dosimetry method comprising a step of irradiating the radiation dosimeter according to the tenth aspect with a radiation.

A twelfth aspect of the present invention is a method for producing a radiation dosimetry gel, the method comprising a step of mixing the gelator specified in any one of the first to ninth aspects and a compound of Formula (1).

Effects of the Invention

The radiation dosimetry gel of the present invention exhibits excellent sensitivity to radiation exposure, as compared with a conventional polymer gel dosimeter containing a widely used polymerizable crosslinking agent such as N,N'-methylenebisacrylamide. In particular, the compound of Formula (1) used in the present invention does not require heating when dissolved in water, and can be readily dissolved in water without use of a dissolution aid (e.g., a comonomer) as an essential component. The compound can form a gel in combination with various comonomers. The radiation dosimetry gel exhibits further improved sensitivity to radiation exposure, depending on the selection of a comonomer used.

The radiation dosimetry gel of the present invention can be produced from industrially readily available raw materials. As described above, the compound of Formula (1) used in the present invention can be readily dissolved in water. In particular, the gel can be produced only by mixing the compound with the gelator containing the water-soluble organic polymer (A), the silicate salt (B), and the dispersant (C) for the silicate salt at room temperature without the need for heating. Thus, the radiation dosimetry gel of the present invention can be readily provided as a gel having a constant quality. The radiation dosimetry gel, which is an injectable gel, can be used as a material for radiation dosimetry in a radiation dosimeter.

Furthermore, the radiation dosimetry gel of the present invention exhibits a sufficient strength. For example, the radiation dosimetry gel typically exhibits hardness ("elastic modulus") and strength ("rupture stress") to such an extent that the gel can hold its shape without a support (e.g., a container); i.e., the radiation dosimetry gel has self-supporting ability. Thus, the radiation dosimetry gel of the present invention can be used in a glass or plastic container, and also used for preparation of a flexible gel dosimeter with use of a plastic wrap having low oxygen permeability.

MODES FOR CARRYING OUT THE INVENTION

Figure 1:
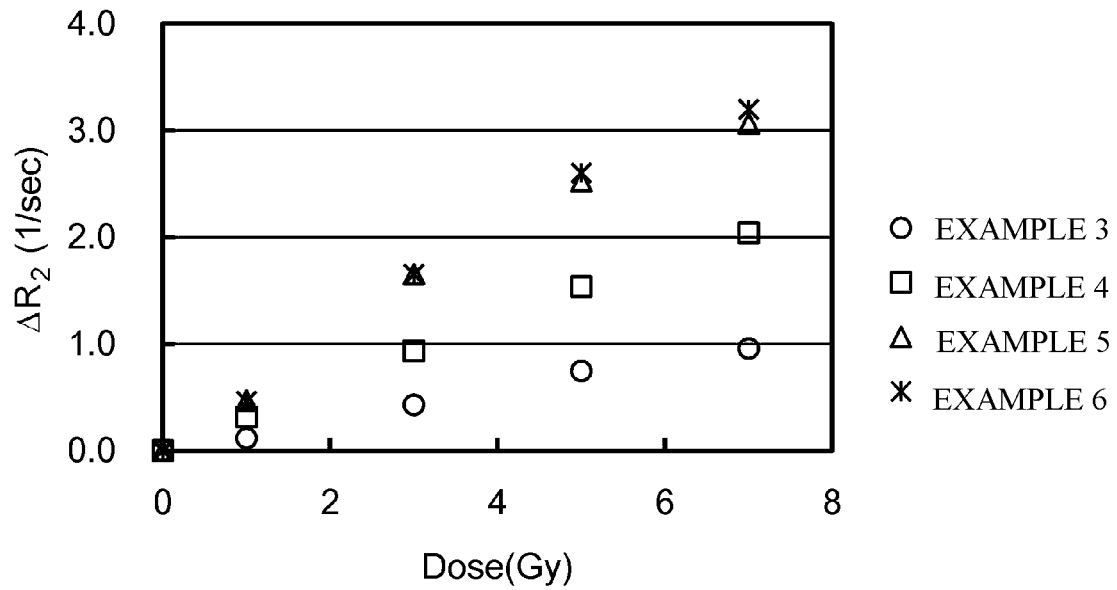
FIG. 1 shows the results of a radiation exposure test of the radiation dosimeters of Examples 3 to 6.

The present inventors have conducted extensive studies on a polymer gel dosimeter exhibiting high sensitivity and high safety, and have conducted studies on the use of a polyfunctional acrylamide derivative as a polymerizable crosslinking agent for forming the gel in the dosimeter. Specifically, the present inventors have conducted studies on a gel containing an acrylamide derivative of Formula (1) as a polymerizable crosslinking agent. Consequently, the present inventors have found that the derivative is readily dissolved in water, and the gel can be formed through dissolution of the derivative in water without the need for heating or a dissolution aid, and that the derivative can be combined with various monomers as comonomer, and the resultant gel exhibits improved sensitivity to radiation exposure.

The present invention will next be described in detail.

[Radiation Dosimetry Gel]

The radiation dosimetry gel of the present invention contains, as essential components, a gelator, and a compound having a polyfunctional acrylamide structure [a compound of Formula (1)] serving as a polymerizable crosslinking agent. The radiation dosimetry gel of the present invention may contain water besides the aforementioned components. If necessary, the radiation dosimetry gel may contain any additional component, so long as the intended effects of the present invention are not impaired.

<Gelator>

Examples of the gelator include natural polymers derived from animals and plants. Specific examples of the gelator include gelatin, agarose, xanthan gum, carrageenan, gellan gum, chitosan, and alginic acid or salts thereof. In the present invention, these gelators may be used alone or in combination of two or more species.

The amount of the aforementioned natural polymer is 0.01% by mass to 30% by mass, preferably 0.05% by mass to 20% by mass, relative to the entire mass (100% by mass) of the radiation dosimetry gel.

The gelator used in the present invention may be a gelator containing a water-soluble organic polymer (A) having an organic acid structure, an organic acid salt structure, or an organic acid anion structure, a silicate salt (B), and a dispersant (C) for the silicate salt.

The gelator used in the present invention is preferably the aforementioned natural polymer, or the aforementioned gelator containing the water-soluble organic polymer (A) having an organic acid structure, an organic acid salt structure, or an organic acid anion structure, the silicate salt (B), and the dispersant (C) for the silicate salt. In the case where the resultant gel is required to have heat resistance or strength, the gelator containing the aforementioned components (A) to (C) is more preferably used.

<<Component (A): Water-Soluble Organic Polymer Having Organic Acid Structure, Organic Acid Salt Structure, or Organic Acid Anion Structure>>

The component (A) forming the gelator (i.e., the water-soluble organic polymer having an organic acid structure, an organic acid salt structure, or an organic acid anion structure) is, for example, an organic polymer which has, on a side chain thereof, a plurality of organic acid groups such as a carboxyl group, a sulfonyl group, and a phosphonyl group, an organic acid salt structure, or an organic acid anion structure, and which is freely dissolved in water.

Examples of the water-soluble organic polymer (A) having an organic acid structure include polymers having a carboxyl group, such as poly(meth)acrylic acid, carboxyvinyl polymer, and carboxymethyl cellulose; polymers having a sulfonyl group, such as polystyrenesulfonic acid; and polymers having a phosphonyl group, such as polyvinylphosphonic acid. Of these, polyacrylic acid is preferred.

As used herein, the term "(meth)acrylic acid" refers to both acrylic acid and methacrylic acid.

Examples of the organic acid salt structure include salts of the aforementioned organic acid groups, such as sodium salt, ammonium salt, potassium salt, and lithium salt.

Examples of the organic acid anion structure include structures formed by dissociation of cations from the aforementioned organic acids groups or organic acid salts.

The water-soluble organic polymer (A) preferably has a linear-chain structure and has neither a branched structure nor a chemically crosslinked structure. The water-soluble organic polymer (A) may be a completely neutralized product having only an organic acid salt structure, or a partially neutralized product having both an organic acid structure and an organic acid salt structure, or a mixture of the completely neutralized product and the partially neutralized product.

The water-soluble organic polymer (A) has a weight average molecular weight of preferably 1,000,000 to 10,000,000, more preferably 2,000,000 to 7,500,000, as measured by gel permeation chromatography (GPC) in terms of polyethylene glycol.

The water-soluble organic polymer (A) is preferably a completely neutralized or partially neutralized polyacrylic acid salt, more preferably a completely neutralized or partially neutralized linear-chain polyacrylic acid salt, particularly preferably completely neutralized or partially neutralized linear-chain sodium polyacrylate having a weight average molecular weight of 1,000,000 to 10,000,000 (more preferably 2,000,000 to 7,500,000). The degree of partial neutralization is 10% to 90%, preferably 30% to 80%.

The amount of the water-soluble organic polymer (A) is 0.01% by mass to 20% by mass, preferably 0.05% by mass to 10% by mass, relative to the entire mass (100% by mass) of the radiation dosimetry gel.

<<Component (B): Silicate Salt>>

Examples of the silicate salt (B) include particles of water-swellable silicate salts, such as smectite, bentonite, vermiculite, and mica. The silicate salt (B) preferably forms a colloid with water or a water-containing liquid serving as a dispersion medium. The term "smectite" is a generic name of swellable clay minerals including montmorillonite, beidellite, hectorite, saponite, and stevensite.

Primary particles of the silicate salt are in, for example, a disc-like, plate-like, spherical, particulate, cubic, acicular, rod-like, or amorphous form. For example, the silicate salt is preferably in the form of disk-like or plate-like particles having a diameter of 5 nm to 1,000 nm. For example, the below-exemplified LAPONITE XLG is disk-like silicate salt particles having a diameter of 20 nm to 100 nm.

Preferred specific examples of the silicate salt include layered silicate salts. Examples of readily available commercial products include LAPONITE XLG (synthetic hectorite), LAPONITE XLS (synthetic hectorite containing sodium pyrophosphate as a dispersant), LAPONITE XL21 (sodium magnesium fluorosilicate), LAPONITE RD (synthetic hectorite), LAPONITE RDS (synthetic hectorite containing an inorganic polyphosphate salt as a dispersant), and LAPONITE S482 (synthetic hectorite containing a dispersant) manufactured by BYK; Lucentite SWN (synthetic smectite) and Lucentite SWF (synthetic smectite), Micromica (synthetic mica), and Somasif (synthetic mica) manufactured by Kataoka & Co-op Agri Corporation (former Co-op Chemical Co., Ltd.); KUNIPIA (montmorillonite) and SUMECTON SA (synthetic saponite) manufactured by Kunimine Industries Co., Ltd.; and BEN-GEL (purified product of natural bentonite) manufactured by HOJUN Co., Ltd.

The amount of the silicate salt (B) is 0.01% by mass to 20% by mass, preferably 0.05% by mass to 10% by mass, relative to the entire mass (100% by mass) of the radiation dosimetry gel.

<<Component (C): Dispersant for Silicate Salt>>

The component (C) is a dispersant for the silicate salt (B). The dispersant (C) may be a dispersant or deflocculant used for the purpose of improvement of the dispersibility of a silicate salt or exfoliation of a layered silicate salt. The dispersant (C) may be, for example, a phosphate salt dispersant, a carboxylate salt dispersant, a dispersant acting as an alkali, a dispersant that reacts with a polyvalent cation to form an insoluble salt or a complex salt, or an organic deflocculant.

Examples of the phosphate salt dispersant include sodium orthophosphate, sodium pyrophosphate, sodium tripolyphosphate, sodium tetraphosphate, sodium hexametaphosphate, sodium polyphosphate, and sodium etidronate. Examples of the carboxylate salt dispersant include sodium poly(meth)acrylate, ammonium poly(meth)acrylate, sodium acrylate/sodium maleate copolymers, and ammonium acrylate/ammonium maleate copolymers. Examples of the dispersant acting as an alkali include sodium hydroxide and hydroxylamine. Examples of the dispersant that reacts with a polyvalent cation to form an insoluble salt or a complex salt include sodium carbonate and sodium silicate. Examples of the organic deflocculant include polyethylene glycol, polypropylene glycol, sodium humate, and sodium ligninsulfonate. Preferably, the phosphate salt dispersant is sodium pyrophosphate and sodium etidronate; the carboxylate salt dispersant is sodium poly(meth)acrylate; and the organic deflocculant is polyethylene glycol (e.g., PEG 900).

Of these dispersants, preferred is a carboxylate salt dispersant, more preferred is sodium poly(meth)acrylate, and particularly preferred is low-polymerization sodium polyacrylate having a weight average molecular weight of 1,000 to 20,000. The low-polymerization sodium polyacrylate is known to act as a dispersant through, for example, a mechanism by which the low-polymerization sodium polyacrylate interacts with silicate salt particles to generate carboxy anion-derived negative charges on the surfaces of the particles, to thereby disperse the silicate salt by charge repulsion.

The amount of the dispersant (C) is 0.01% by mass to 20% by mass, preferably 0.03% by mass to 10% by mass, more preferably 0.05% by mass to 10% by mass, relative to the amount (100% by mass) of the radiation dosimetry gel.

In the present invention, when the silicate salt (B) is in the form of a product containing the dispersant (C) (e.g., when a commercially available product is used), the dispersant (C) is not necessarily further added.

<<Component (D): Compound Having Di- or More Valent Positive Charge>>

If necessary, the aforementioned gel may contain a compound (D) having a di- or more valent positive charge.

Examples of the compound (D) include one or more compounds selected from the group consisting of a compound containing a Group 2 element, a compound containing a transition metal element, a compound containing an amphoteric element, and a compound containing a polyamine.

Examples of the compound containing a Group 2 element include compounds of beryllium, magnesium, and calcium. Examples of the compound containing a transition metal element include compounds of scandium, titanium, vanadium, chromium, manganese, iron, cobalt, nickel, copper, zirconium, molybdenum, ruthenium, rhodium, and palladium. Examples of the compound containing an amphoteric element include compounds of zinc, cadmium, mercury, aluminum, gallium, indium, thallium, tin, and lead. Examples of the compound containing a polyamine include compounds of ethylenediamine, phenylenediamine, hydrazine, putrescine, cadaverine, spermidine, and spermine.

Such a compound is in the form of an oxide, hydroxide, or salt having a di- or more valent positive charge. The polyamine may be in a free form.

Examples of the acid forming the salt include sulfuric acid, hydrochloric acid, hydrobromic acid, hydrofluoric acid, trifluoroacetic acid, acetic acid, phosphoric acid, diphosphoric acid, hexametaphosphoric acid, polyphosphoric acid, silicic acid, aluminic acid, trifluoromethanesulfonic acid, methanesulfonic acid, and p-toluenesulfonic acid.

The compound (D) having a di- or more valent positive charge is preferably hydrochloride, sulfate, diphosphate, silicate, and aluminate of magnesium, calcium, and aluminum, and more preferably magnesium chloride, calcium chloride, magnesium sulfate, aluminum sulfate, calcium diphosphate, and magnesium alminosilicate.

When the aforementioned gel contains the component (D), the amount of the compound (D) is 0.01% by mass to 50% by mass, preferably 0.05% by mass to 10% by mass, relative to the entire mass (100% by mass) of the radiation dosimetry gel.

A preferred combination of the water-soluble organic polymer (A), the silicate salt (B), and the dispersant (C) for the silicate salt (B), which form the aforementioned gelator, is, for example, a combination wherein the component (A) is completely neutralized or partially neutralized linear-chain sodium polyacrylate having a weight average molecular weight of 2,000,000 to 7,500,000 in an amount of 0.05% by mass to 10% by mass relative to 100% by mass of the radiation dosimetry gel, the component (B) is water-swellable smectite or saponite in an amount of 0.05% by mass to 10% by mass relative to 100% by mass of the radiation dosimetry gel, and the component (C) is sodium pyrophosphate in an amount of 0.05% by mass to 10% by mass or sodium polyacrylate having a weight average molecular weight of 1,000 to 20,000 in an amount of 0.05% by mass to 10% by mass relative to 100% by mass of the radiation dosimetry gel.

When the gelator of the present invention contains the component (D), a preferred combination of the water-soluble organic polymer (A), the silicate salt (B), the dispersant (C) for the silicate salt (B), and the compound (D) is, for example, a combination wherein the component (A) is completely neutralized or partially neutralized linear-chain sodium polyacrylate having a weight average molecular weight of 2,000,000 to 7,500,000 in an amount of 0.05% by mass to 10% by mass relative to 100% by mass of the radiation dosimetry gel, the component (B) is water-swellable smectite or saponite in an amount of 0.05% by mass to 10% by mass relative to 100% by mass of the radiation dosimetry gel, the component (C) is sodium pyrophosphate in an amount of 0.05% by mass to 10% by mass or sodium polyacrylate having a weight average molecular weight of 1,000 to 20,000 in an amount of 0.05% by mass to 10% by mass relative to 100% by mass of the radiation dosimetry gel, and the component (D) is magnesium chloride or calcium chloride or magnesium sulfate in an amount of 0.05% by mass to 10% by mass relative to 100% by mass of the radiation dosimetry gel.

[Compound of Formula (1)]

The radiation dosimetry gel of the present invention contains a compound of the following Formula (1) as a polymerizable crosslinking agent.

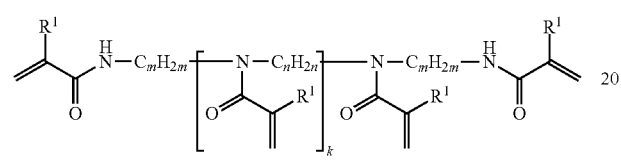
(1)

In Formula (1), $R^1$ is a hydrogen atom or a methyl group. Preferably, $R^1$ is a hydrogen atom. A plurality of $R^1$s may be the same as or different from one another, and are preferably the same as one another.

In Formula (1), m is an integer of 2 to 4, and is preferably 2. A plurality of ms may be the same as or different from one another, and are preferably the same as one another. The carbon chain of $C_mH_{2m}$ may be a linear or branched chain, and is preferably a linear chain.

In Formula (1), n is an integer of 2 to 4. The carbon chain of $C_nH_{2n}$ may be a linear or branched chain, and is preferably a linear chain.

In Formula (1), k is 0 or 1. Preferably, k is 0.

Specific examples of the compound of Formula (1) include, but are not limited to, those described below.

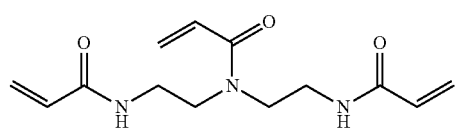
(1)-1

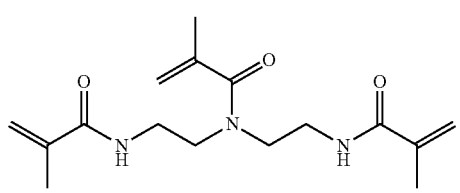
(1)-2

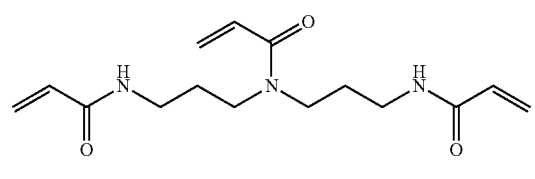
(1)-3

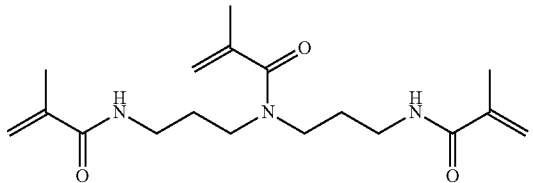
(1)-4

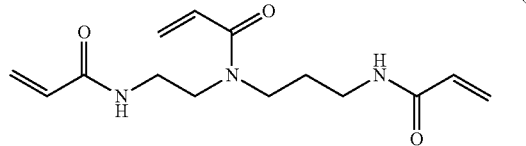
(1)-5

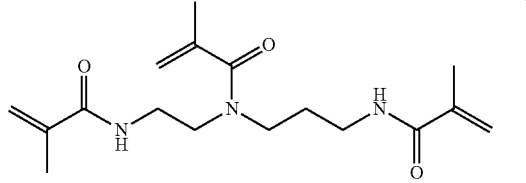
(1)-6

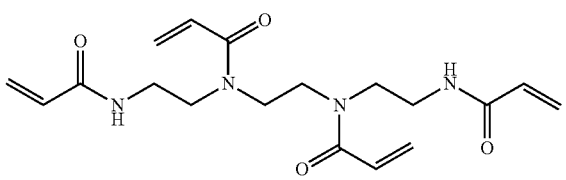
(1)-7

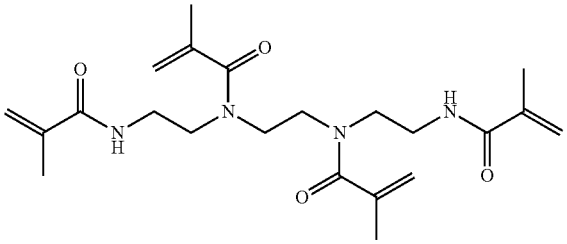
(1)-8

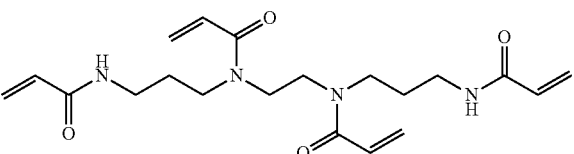
(1)-9

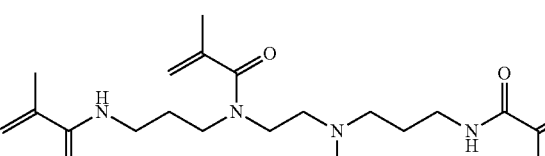
(1)-10

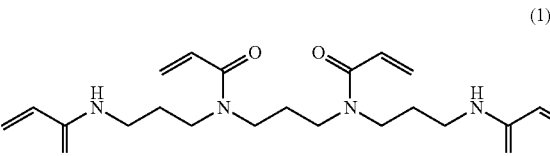
(1)-11

(1)-12
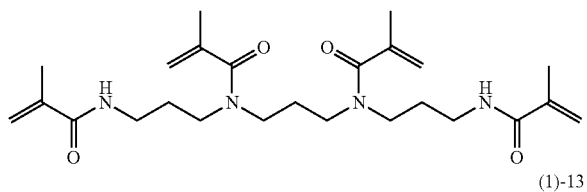

(1)-13
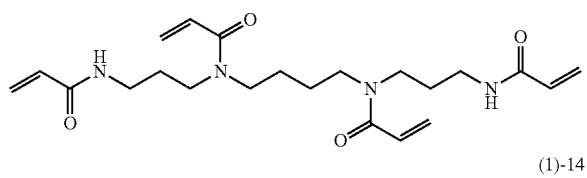

(1)-14
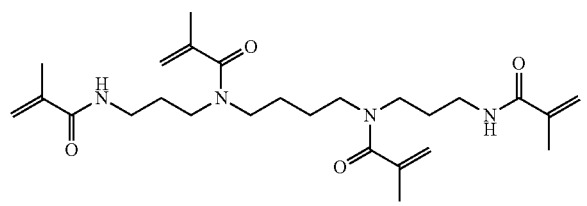

Among compounds of Formula (1), compound (1)-1, (1)-3, (1)-5, or (1)-7 is preferred, and compound (1)-1 is more preferred.

The amount of the compound of Formula (1) is 1% by mass to 15% by mass, preferably 2% by mass to 6% by mass, relative to the entire mass (100% by mass) of the radiation dosimetry gel.

[Monomer Capable of Being Polymerized by Radiation Exposure]

The radiation dosimetry gel of the present invention may contain a monomer capable of being polymerized by radiation exposure. In such a case, the radiation dosimetry gel of the present invention exhibits improved dose sensitivity to radiation, and a radiation dosimeter containing the gel as a material for radiation dosimetry functions as a polymer gel dosimeter having higher sensitivity.

No particular limitation is imposed on the monomer capable of being polymerized by radiation exposure, so long as it has a carbon-carbon unsaturated bond that enables polymerization by the effect of radiation. Examples of the monomer include methyl methacrylate, ethyl methacrylate, 2-methoxymethyl methacrylate, 2-ethoxymethyl methacrylate, 2-hydroxyethyl methacrylate, triethylene glycol monoethyl ether monomethacrylate, methyl acrylate, ethyl acrylate, butyl acrylate, 2-methoxyethyl acrylate, N-vinyl-2-pyrrolidone, acrylamide, N,N-dimethylacrylamide, acryloylmorpholine, N-isopropylacrylamide, methacryloyl-L-alanine methyl ester, and acryloyl-L-proline methyl ester.

When the radiation dosimetry gel of the present invention contains the monomer capable of being polymerized by radiation exposure, the amount of the monomer is, for example, 2% by mass to 15% by mass, preferably 3% by mass to 8% by mass, relative to the entire mass (100% by mass) of the radiation dosimetry gel.

The radiation dosimetry gel may contain, besides the compound of Formula (1), at least one monomer having two or more unsaturated bonds in one molecule (hereinafter the monomer may be referred to as "additional polymerizable crosslinking agent"). Examples of the additional polymerizable crosslinking agent include N,N'-methylenebisacrylamide, N,N'-diallylacrylamide, N,N'-diacryloylimide, triallylformal, 1,3,5-triacryloylhexahydro-1,3,5-triazine, diallylnaphthalene, ethylene glycol diacrylate, ethylene glycol dimethacrylate, any polyethylene glycol di(meth)acrylate, propylene glycol diacrylate, propylene glycol dimethacrylate, any polypropylene glycol di(meth)acrylate, 1,3-butylene glycol diacrylate, 1,3-butylene glycol dimethacrylate, 1,4-butylene glycol dimethacrylate, any polybutylene glycol di(meth)acrylate, glycerol dimethacrylate, neopentyl glycol dimethacrylate, trimethylolpropane triacrylate, trimethylolpropane trimethacrylate, tetramethylolmethane tetramethacrylate, and divinyl compounds such as divinylbenzene. The aforementioned polyethylene glycol di(meth)acrylate has 1, 2, 3, 4, 9, 14, or 23 ethylene glycol units. In particular, a water-soluble polyethylene glycol di(meth)acrylate having 9 or more ethylene glycol units is preferably used, from the viewpoint of solubility. Some of the aforementioned monomers exhibit poor water solubility. However, such a poorly water-soluble monomer may be used, so long as the monomer uniformly disperses in the gel, and the entire gel exhibits transparency before radiation exposure. In order to further improve uniform dispersibility, an organic solvent such as alcohol may be added in an amount of 5% or less.

<Additional Additive>

The radiation dosimetry gel of the present invention preferably contains a deoxidizer (e.g., ascorbic acid, tetrakis(hydroxymethyl)phosphonium chloride (THPC), or tetrakis(hydroxymethyl)phosphonium sulfate (THPS)) or a pH adjuster (e.g., glucono-δ-lactone, perchloric acid, sulfuric acid, or sodium chloride) for promoting the polymerization reaction by radiation exposure to thereby enhance radiation sensitivity. The radiation dosimetry gel of the present invention may contain, for example, a free radical scavenger (e.g., hydroquinone or phenylenediamine) or an ultraviolet absorber (e.g., guaiazulene) for reducing polymerization by the remaining monomer after radiation exposure. If necessary, the radiation dosimetry gel of the present invention may further contain, for example, a colorant.

[Production Method for Radiation Dosimetry Gel]

No particular limitation is imposed on the production method for the radiation dosimetry gel. The radiation dosimetry gel can be produced through, for example, the following procedure: a gelator (a natural polymer such as gelatin, or the aforementioned components (A) to (C)) and a compound of Formula (1) are mixed in predetermined proportions; if desired, the mixture is further mixed with the component (D), a monomer capable of being polymerized by radiation exposure, and an additional additive; the mixture is further mixed with water; and the resultant mixture is allowed to stand still for gelation. Each of the aforementioned components, additives, etc. may be added in the form of a water-containing solution or an aqueous dispersion.

In the case where, for example, a gelator containing the aforementioned components (A) to (C) is used, the radiation dosimetry gel can be produced through, for example, the following procedure: a mixture of two components of the components (A) to (C) or an aqueous solution or water-containing solution of the mixture is mixed with the remaining one component or an aqueous solution or water-containing solution of the component, and, if desired, mixed with the component (D), a monomer capable of being polymerized by radiation exposure, and an additional additive, or a water-containing solution of the component, the monomer, and the additive, and an additive; and the resultant mixture is allowed to stand still for gelation. The gelation can be performed by addition of water or a water-containing solution to a mixture of the respective components.

The component (D) may be incorporated during mixing of the respective components before gelation, or may be incorporated by immersion of the gel in an aqueous solution of the component (D) after gelation. These processes (operations) may be performed in combination.

In the case of the aforementioned immersion process, the concentration of the component (D) in the aqueous solution is generally 0.1% by mass to 50% by mass, preferably 1% by mass to 30% by mass, more preferably 5% by mass to 20% by mass.

The aforementioned gelator (natural polymer, or the components (A) to (C)) is mixed with, if desired, additional components, for example, the component (D), a monomer capable of being polymerized by radiation exposure, and an additional additive. The mixing of these components can be performed by mechanical or manual stirring, or ultrasonic treatment. In particular, mechanical stirring is preferred. The mechanical stirring can be performed with, for example, a magnetic stirrer, a propeller-type stirrer, a planetary centrifugal mixer, a disper, a homogenizer, a shaker, a vortex mixer, a ball mill, a kneader, or an ultrasonic oscillator. Of these, a planetary centrifugal mixer is preferably used for mixing.

The temperature during mixing is the freezing point to the boiling point of the mixture (aqueous solution or aqueous dispersion), preferably −5° C. to 100° C., more preferably 0° C. to 50° C.

Although the mixture has low strength and is in the form of sol immediately after completion of the mixing, the mixture gelates after being allowed to stand still. The mixture is preferably allowed to stand still for two hours to 100 hours. The mixture is allowed to stand still at a temperature of −5° C. to 100° C., preferably 0° C. to 50° C. When the mixture is poured into a mold or subjected to extrusion molding immediately after completion of the mixing and before gelation, the mixture can be formed into a radiation dosimetry gel having any desired shape.

[Radiation Dosimeter]

The radiation dosimetry gel of the present invention is suitable as a material for radiation dosimetry. Thus, the radiation dosimetry gel can be charged into a container to produce a radiation dosimeter, for example, a phantom. No particular limitation is imposed on the container, so long as it is insensitive to MRI, allows radiation to transmit therethrough, and has, for example, solvent resistance and air-tightness. Preferred examples of the material of the container include glass, acrylic resin, polyester, and ethylene-vinyl alcohol copolymers. When the container is transparent, a three-dimensional dose distribution can be measured not only with MRI, but also with optical CT capable of three-dimensional measurement of white turbidity. After charging of the radiation dosimetry gel into the container, the remaining space of the container may be purged with, for example, nitrogen gas.

[Radiation Dosimetry Method]

The present invention is also directed to a radiation dosimetry method using the aforementioned radiation dosimeter.

No particular limitation is imposed on the radiation dosimetry method, so long as the method includes a step of irradiating the radiation dosimeter with a radiation. Examples of the irradiation device usable in the radiation irradiation step include general-purpose X-ray irradiation devices, and devices used for advanced cancer radiation therapies, such as IMRT (intensity modulated radiotherapy) and SRT (stereotactic radiotherapy) using radiations of high dose concentration and charged particulate radiations such as proton beams and heavy particle beams (e.g., carbon beams or neon beams). The aforementioned radiation dosimeter can also be used in radiation exposure assuming actual treatment. In the dose analysis method after the radiation exposure, the amount of absorbed dose is determined by using relaxation rate $R_2$-absorbed dose characteristics from an $R_2$ image taken with, for example, an X-ray CT device, an optical CT device, an ultrasonic echo device, or MRI, to thereby quantify an absorbed dose distribution of the radiation dosimeter after the radiation exposure.

Specifically, the radiation dose is determined by, for example, the radiation exposure test method of a radiation dosimeter described in [Radiation Exposure Test of Radiation Dosimeter] of the below-described Examples.

EXAMPLES

The present invention will next be described in detail by way of Examples, but the present invention should not be construed as being limited to the Examples.

The compounds used in Examples are as follows.
[Compound of Formula (1)]
N,N-bis(2-acrylamidoethyl)acrylamide (FAM-301): trade name "FAM-301" available from FUJIFILM Corporation

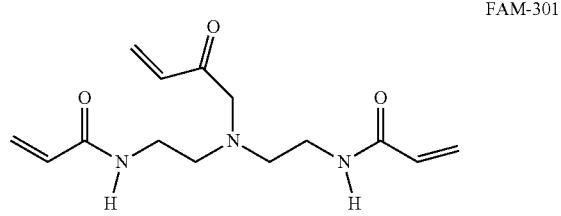 [SMILES: C=CC(=O)CN(CCNC(=O)C=C)CCNC(=O)C=C]

N,N-bis(2-acrylamidoethyl)acrylamide was subjected to recrystallization treatment with tetrahydrofuran/hexane (1/1) and then used.

[Monomer Capable of Being Polymerized by Radiation Exposure]

Acrylamide (AAm): available from FUJIFILM Wako Pure Chemical Corporation N-vinyl-2-pyrrolidone (NVP): available from Tokyo Chemical Industry Co., Ltd.

2-Hydroxyethyl methacrylate (HEMA): available from Tokyo Chemical Industry Co., Ltd.

N,N-dimethylacrylamide (DiMeAAm): available from Tokyo Chemical Industry Co., Ltd.

N-isopropylacrylamide (NIPAM): available from Tokyo Chemical Industry Co., Ltd.

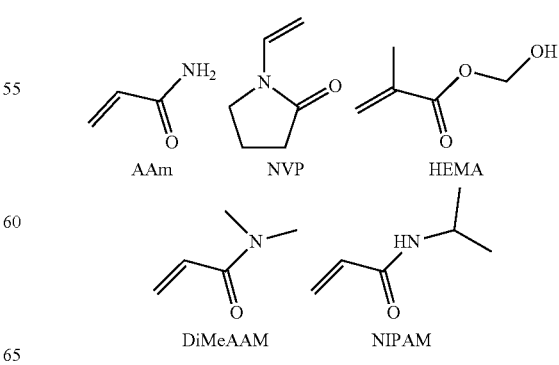

[Additional Additive]

Tetrakis(hydroxymethyl)phosphonium chloride (THPC) (80% aqueous solution, available from Aldrich)

Hydroquinone (HQ): available from FUJIFILM Wako Pure Chemical Corporation

[Additional Compound]

N,N'-methylenebisacrylamide (Bis): available from FUJIFILM Wako Pure Chemical Corporation

[Production of Radiation Dosimeter Containing Radiation Dosimetry Gel (Containing Gelatin as Gelator) as Material for Radiation Dosimetry]

Example 1

Firstly, 4 g of N,N-bis(2-acrylamidoethyl)acrylamide (available from FUJIFILM Corporation), 10 g of gelatin (available from Sigma-Aldrich), 6 g of acrylamide (available from FUJIFILM Wako Pure Chemical Corporation), and 360 μL of 80% aqueous solution of tetrakis(hydroxymethyl)phosphonium chloride (available from Aldrich) were added to 180 g of water. The mixture was heated at 45° C. to 50° C., and then stirred until homogeneity was achieved. The resultant mixture was charged into a 30 mL PET bottle, and then cooled in a refrigerator for 20 hours while being allowed to stand still, to thereby prepare a target product for radiation exposure test.

Example 2

Firstly, 6 g of N,N-bis(2-acrylamidoethyl)acrylamide (available from FUJIFILM Corporation), 10 g of gelatin (available from Sigma-Aldrich), 6 g of acrylamide (available from FUJIFILM Wako Pure Chemical Corporation), and 360 μL of 80% aqueous solution of tetrakis(hydroxymethyl)phosphonium chloride (available from Aldrich) were added to 178 g of water. The mixture was heated at 45° C. to 50° C., and then stirred until homogeneity was achieved. The resultant mixture was charged into a 30 mL PET bottle, and then cooled in a refrigerator for 20 hours while being allowed to stand still, to thereby prepare a target product for radiation exposure test.

TABLE 1

Examples 1 and 2
Formulation of radiation dosimeter sample

|  | Gelatin | FAM-301 | AAm | THPC solution |
|---|---|---|---|---|
| Example 1 | 5% | 2% | 3% | 10 mM |
| Example 2 | 5% | 3% | 3% | 10 mM |

* "%" in the table denotes % by mass relative to a radiation dosimeter sample (gel) (100% by mass).
* The balance is water.

Production Example 1: Production of Aqueous Dispersion of Silicate Salt

6 Parts of LAPONITE XLG (available from BYK) was mixed with 7.1 parts of 35% aqueous solution of low-polymerization sodium polyacrylate (weight average molecular weight: 15,000, available from Sigma-Aldrich) and 86.9 parts of water, and the mixture was stirred at 25° C. until a homogeneous aqueous dispersion was prepared. Thus, a target product was produced.

Production Example 2: Production of Aqueous Solution of High-Polymerization Sodium Polyacrylate 2 Parts of high-polymerization sodium polyacrylate [available from FUJIFILM Wako Pure Chemical Corporation, degree of polymerization: 22,000 to 70,000, weight average molecular weight: 2,068,000 to 6,580,000 {unit molecular weight: 94, calculated as (—CH2-CHCOONa—)}, completely neutralized] was mixed with 98 parts of water, and the mixture was stirred at 25° C. until a homogeneous aqueous solution was prepared. Thus, a target product was produced.

[Production of Radiation Dosimeter Containing Radiation Dosimetry Gel (Containing Gelator Containing Water-Soluble Organic Polymer, Silicate Salt, and Dispersant for Silicate Salt) as Material for Radiation Dosimetry]

Example 3

Firstly, 2 g of N,N-bis(2-acrylamidoethyl)acrylamide (available from FUJIFILM Corporation), 16 g of N-vinyl-2-pyrrolidone (available from Tokyo Chemical Industry Co., Ltd.), and 22 g of the aqueous solution of high-polymerization sodium polyacrylate produced in Production Example 2 were added to 136 g of water, and the mixture was stirred at room temperature, followed by degassing under vacuum. Subsequently, the mixture was cooled with ice water, and 2.4 g of 80% aqueous solution of tetrakis(hydroxymethyl)phosphonium chloride (available from Aldrich) was added to the mixture at about 12° C. The mixture was stirred until homogeneity was achieved. Thereafter, 22 g of the aqueous dispersion of silicate salt produced in Production Example 1 was added to the mixture, and the mixture was stirred for one minute. The resultant mixture was charged into a 30 mL PET bottle, and then cooled in a refrigerator for 20 hours while being allowed to stand still, to thereby prepare a target product for radiation exposure test.

Example 4

Firstly, 4 g of N,N-bis(2-acrylamidoethyl)acrylamide (available from FUJIFILM Corporation), 16 g of N-vinyl-2-pyrrolidone (available from Tokyo Chemical Industry Co., Ltd.), and 22 g of the aqueous solution of high-polymerization sodium polyacrylate produced in Production Example 2 were added to 134 g of water, and the mixture was stirred at room temperature, followed by degassing under vacuum. Subsequently, the mixture was cooled with ice water, and 2.4 g of 80% aqueous solution of tetrakis(hydroxymethyl)phosphonium chloride (available from Aldrich) was added to the mixture at about 12° C. The mixture was stirred until homogeneity was achieved. Thereafter, 22 g of the aqueous dispersion of silicate salt produced in Production Example 1 was added to the mixture, and the mixture was stirred for one minute. The resultant mixture was charged into a 30 mL PET bottle, and then cooled in a refrigerator for 20 hours while being allowed to stand still, to thereby prepare a target product for radiation exposure test.

Example 5

Firstly, 6 g of N,N-bis(2-acrylamidoethyl)acrylamide (available from FUJIFILM Corporation), 16 g of N-vinyl-2-pyrrolidone (available from Tokyo Chemical Industry Co., Ltd.), and 22 g of the aqueous solution of high-polymerization sodium polyacrylate produced in Production Example 2 were added to 132 g of water, and the mixture was stirred at room temperature, followed by degassing under vacuum. Subsequently, the mixture was cooled with ice water, and 2.4 g of 80% aqueous solution of tetrakis(hydroxymethyl)phosphonium chloride (available from Aldrich) was added to the mixture at about 12° C. The mixture was stirred until homogeneity was achieved. Thereafter, 22 g of the aqueous dispersion of silicate salt produced in Production Example 1 was added to the mixture, and the mixture was stirred for one minute. The resultant mixture was charged into a 30 mL PET bottle, and then cooled in a refrigerator for 20 hours while being allowed to stand still, to thereby prepare a target product for radiation exposure test.

Example 6

Firstly, 8 g of N,N-bis(2-acrylamidoethyl)acrylamide (available from FUJIFILM Corporation), 16 g of N-vinyl-2-pyrrolidone (available from Tokyo Chemical Industry Co., Ltd.), and 22 g of the aqueous solution of high-polymerization sodium polyacrylate produced in Production Example 2 were added to 130 g of water, and the mixture was stirred at room temperature, followed by degassing under vacuum. Subsequently, the mixture was cooled with ice water, and 2.4 g of 80% aqueous solution of tetrakis(hydroxymethyl)phosphonium chloride (available from Aldrich) was added to the mixture at about 12° C. The mixture was stirred until homogeneity was achieved. Thereafter, 22 g of the aqueous dispersion of silicate salt produced in Production Example 1 was added to the mixture, and the mixture was stirred for one minute. The resultant mixture was charged into a 30 mL PET bottle, and then cooled in a refrigerator for 20 hours while being allowed to stand still, to thereby prepare a target product for radiation exposure test.

Example 7

Firstly, 4 g of N,N-bis(2-acrylamidoethyl)acrylamide (available from FUJIFILM Corporation), 8 g of 2-hydroxyethyl methacrylate (available from Tokyo Chemical Industry Co., Ltd.), and 22 g of the aqueous solution of high-polymerization sodium polyacrylate produced in Production Example 2 were added to 142 g of water, and the mixture was stirred at room temperature, followed by degassing under vacuum. Subsequently, the mixture was cooled with ice water, and 2.4 g of 80% aqueous solution of tetrakis (hydroxymethyl)phosphonium chloride (available from Aldrich) was added to the mixture at about 12° C. The mixture was stirred until homogeneity was achieved. Thereafter, 22 g of the aqueous dispersion of silicate salt produced in Production Example 1 was added to the mixture, and the mixture was stirred for one minute. The resultant mixture was charged into a 30 mL PET bottle, and then cooled in a refrigerator for 20 hours while being allowed to stand still, to thereby prepare a target product for radiation exposure test.

Example 8

Firstly, 4 g of N,N-bis(2-acrylamidoethyl)acrylamide (available from FUJIFILM Corporation), 8 g of N,N-dimethylacrylamide (available from Tokyo Chemical Industry Co., Ltd.), and 22 g of the aqueous solution of high-polymerization sodium polyacrylate produced in Production Example 2 were added to 142 g of water, and the mixture was stirred at room temperature, followed by degassing under vacuum. Subsequently, the mixture was cooled with ice water, and 2.4 g of 80% aqueous solution of tetrakis (hydroxymethyl)phosphonium chloride (available from Aldrich) was added to the mixture at about 12° C. The mixture was stirred until homogeneity was achieved. Thereafter, 22 g of the aqueous dispersion of silicate salt produced in Production Example 1 was added to the mixture, and the mixture was stirred for one minute. The resultant mixture was charged into a 30 mL PET bottle, and then cooled in a refrigerator for 20 hours while being allowed to stand still, to thereby prepare a target product for radiation exposure test.

Example 9

Firstly, 6 g of N,N-bis(2-acrylamidoethyl)acrylamide (available from FUJIFILM Corporation), 12 g of N-isopropylacrylamide (available from Tokyo Chemical Industry Co., Ltd.), and 22 g of the aqueous solution of high-polymerization sodium polyacrylate produced in Production Example 2 were added to 136 g of water, and the mixture was stirred at room temperature, followed by degassing under vacuum. Subsequently, the mixture was cooled with ice water, and 2.4 g of 80% aqueous solution of tetrakis (hydroxymethyl)phosphonium chloride (available from Aldrich) was added to the mixture at about 12° C. The mixture was stirred until homogeneity was achieved. Thereafter, 22 g of the aqueous dispersion of silicate salt produced in Production Example 1 was added to the mixture, and the mixture was stirred for one minute. The resultant mixture was charged into a 30 mL PET bottle, and then cooled in a refrigerator for 20 hours while being allowed to stand still, to thereby prepare a target product for radiation exposure test.

Example 10

Firstly, 6 g of N,N-bis(2-acrylamidoethyl)acrylamide (available from FUJIFILM Corporation), 12 g of N-vinyl-2-pyrrolidone (available from Tokyo Chemical Industry Co., Ltd.), and 22 g of the aqueous solution of high-polymerization sodium polyacrylate produced in Production Example 2 were added to 136 g of water, and the mixture was stirred at room temperature, followed by degassing under vacuum. Subsequently, the mixture was cooled with ice water, and 2.4 g of 80% aqueous solution of tetrakis(hydroxymethyl)phosphonium chloride (available from Aldrich) was added to the mixture at about 12° C. The mixture was stirred until homogeneity was achieved. Thereafter, 22 g of the aqueous dispersion of silicate salt produced in Production Example 1 was added to the mixture, and the mixture was stirred for one minute. The resultant mixture was charged into a 30 mL PET bottle, and then cooled in a refrigerator for 20 hours while being allowed to stand still, to thereby prepare a target product for radiation exposure test.

Example 11

Firstly, 6 g of N,N-bis(2-acrylamidoethyl)acrylamide (available from FUJIFILM Corporation), 12 g of N-vinyl-2-pyrrolidone (available from Tokyo Chemical Industry Co., Ltd.), 0.04 g of hydroquinone (available from FUJIFILM Wako Pure Chemical Corporation), and 22 g of the aqueous solution of high-polymerization sodium polyacrylate produced in Production Example 2 were added to 136 g of water, and the mixture was stirred at room temperature, followed by degassing under vacuum. Subsequently, the mixture was cooled with ice water, and 2.4 g of 80% aqueous solution of tetrakis(hydroxymethyl)phosphonium chloride (available from Aldrich) was added to the mixture at about 12° C. The mixture was stirred until homogeneity was achieved. Thereafter, 22 g of the aqueous dispersion of silicate salt produced in Production Example 1 was added to the mixture, and the mixture was stirred for one minute. The resultant mixture was charged into a 30 mL PET bottle, and then cooled in a refrigerator for 20 hours while being allowed to stand still, to thereby prepare a target product for radiation exposure test.

Comparative Example 1

Firstly, 8 g of N,N'-methylenebisacrylamide (Bis) (available from FUJIFILM Wako Pure Chemical Corporation), 16 g of N-vinyl-2-pyrrolidone (available from Tokyo Chemical Industry Co., Ltd.), and 22 g of the aqueous solution of high-polymerization sodium polyacrylate produced in Production Example 2 were added to 130 g of water, and the mixture was stirred at 45° C., followed by degassing through heating (45° C./30 minutes). Subsequently, the mixture was cooled with ice water, and 2.4 g of 80% aqueous solution of tetrakis(hydroxymethyl)phosphonium chloride (available from Aldrich) was added to the mixture at about 12° C. The mixture was stirred until homogeneity was achieved. Thereafter, 22 g of the aqueous dispersion of silicate salt produced in Production Example 1 was added to the mixture, and the mixture was stirred for one minute. The resultant mixture was charged into a 30 mL PET bottle, and then cooled in a refrigerator for 20 hours while being allowed to stand still, to thereby prepare a target product for radiation exposure test.

TABLE 2

Examples 3 to 11 and Comparative Example 1
Formulation of radiation dosimeter sample

| | Production Example 1 | Production Example 2 | FAM-301 | Bis | HEMA | NVP | NIPAM | DiMeAAm | THPC solution | HQ |
|---|---|---|---|---|---|---|---|---|---|---|
| Example 3 | 11% | 11% | 1% | — | — | 8% | — | — | 50 mM | — |
| Example 4 | 11% | 11% | 2% | — | — | 8% | — | — | 50 mM | — |
| Example 5 | 11% | 11% | 3% | — | — | 8% | — | — | 50 mM | — |
| Example 6 | 11% | 11% | 4% | — | — | 8% | — | — | 50 mM | — |
| Example 7 | 11% | 11% | 2% | — | 4% | — | — | — | 50 mM | — |
| Example 8 | 11% | 11% | 2% | — | — | — | — | 4% | 50 mM | — |
| Example 9 | 11% | 11% | 3% | — | — | — | 6% | — | 50 mM | — |
| Example 10 | 11% | 11% | 3% | — | — | 6% | — | — | 50 mM | — |
| Example 11 | 11% | 11% | 3% | — | — | 6% | — | — | 50 mM | 0.02% |
| Comparative Example 1 | 11% | 11% | — | 4% | — | 8% | — | — | 50 mM | — |

* "%" in the table denotes % by mass relative to a radiation dosimeter sample (gel) (100% by mass).
* The balance is water.
* The amounts shown in Production Example 1 (aqueous dispersion of silicate salt) and Production Example 2 (aqueous solution of high-polymerization sodium polyacrylate) each correspond to an amount in terms of liquid.
* The products of Example 6 and Comparative Example 1 have the same formulation (components and amounts), except for FAM-301 and Bis.

[Radiation Exposure Test of Radiation Dosimeter]

Each of the target products for radiation exposure test (radiation dosimeter samples) prepared in Examples 1 to 11 and Comparative Example 1 was irradiated with X-rays (250 kV, 4 mA) by using Radio Flex 250CG (available from Rigaku Corporation (former Rigaku Denki Co., Ltd.)). Specifically, each sample was irradiated with 1 Gy, 3 Gy, 5 Gy, and 7 Gy at a dose rate of 1 Gy/minute. Each sample exhibited white turbidity through X-ray irradiation. This indicated that the sample functions as a radiation dosimeter.

Figure 2:
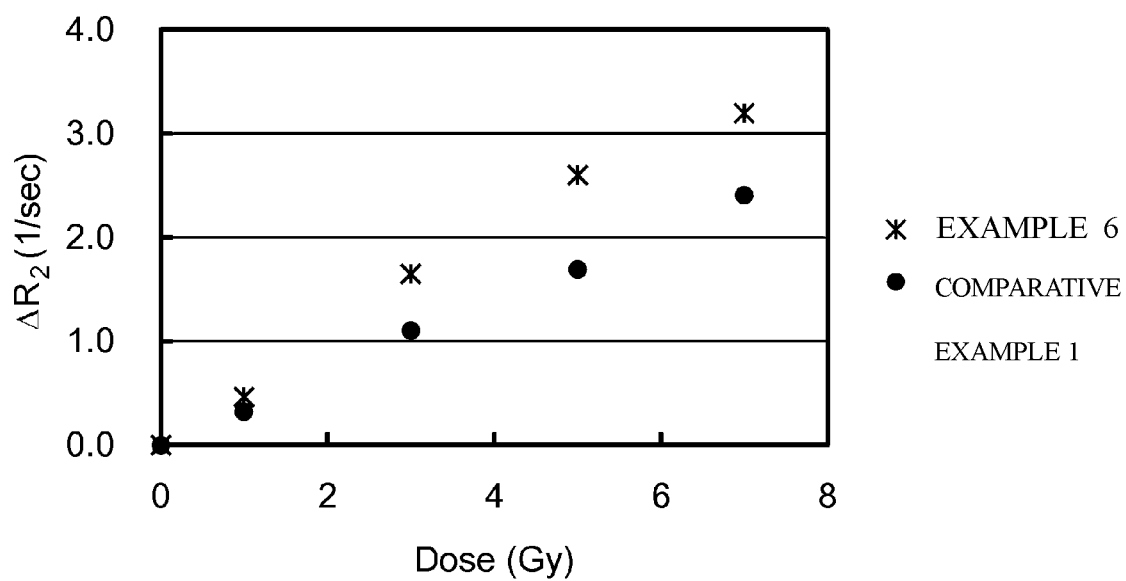
FIG. 2 shows the results of a radiation exposure test of the radiation dosimeters of Example 6 and Comparative Example 1.

Each irradiated sample was analyzed by MRI using 3T MRI (MAGNETOM Prisma, available from Siemens). Spin echo multi-contrast sequence (se_mc) was applied as a pulsed magnetic field for analysis, and the $T_2$ relaxation time of each sample was acquired to thereby calculate $R_2$ (i.e., $1/T_2$). $\Delta R_2$ was calculated by subtracting the $R_2$ of the non-irradiated sample from the $R_2$ of the irradiated sample. The results are shown in Table 3. FIG. 1 shows the results of the radiation exposure test of the radiation dosimeters of Examples 3 to 6, and FIG. 2 shows the results of the radiation exposure test of the radiation dosimeters of Example 6 and Comparative Example 1.

TABLE 3

| Dose (Gy) | Example and Comparative Example Nos. [$\Delta R_2$ (1/sec) value] | | | | | | | | | | | |
|---|---|---|---|---|---|---|---|---|---|---|---|---|
| | 1 | 2 | 3 | 4 | 5 | 6 | 7 | 8 | 9 | 10 | 11 | Comparative 1* |
| 0 | 0.00 | 0.00 | 0.00 | 0.00 | 0.00 | 0.00 | 0.00 | 0.00 | 0.00 | 0.00 | 0.00 | 0.00 |
| 1 | 0.12 | 0.28 | 0.12 | 0.31 | 0.47 | 0.46 | 0.20 | 0.72 | 0.55 | 0.66 | 0.34 | 0.32 |

TABLE 3-continued

| Dose | Example and Comparative Example Nos. [$\Delta R_2$ (1/sec) value] | | | | | | | | | | | |
|---|---|---|---|---|---|---|---|---|---|---|---|---|
| (Gy) | 1 | 2 | 3 | 4 | 5 | 6 | 7 | 8 | 9 | 10 | 11 | Comparative 1* |
| 3 | 0.29 | 0.69 | 0.43 | 0.93 | 1.65 | 1.65 | 1.33 | 1.07 | 2.04 | 1.96 | 0.90 | 1.10 |
| 5 | 0.40 | 0.95 | 0.74 | 1.54 | 2.52 | 2.60 | 1.78 | 1.11 | 2.91 | 2.79 | 1.37 | 1.69 |
| 7 | 0.49 | 1.07 | 0.96 | 2.04 | 3.07 | 3.20 | 1.92 | 1.04 | 3.28 | 3.40 | 1.70 | 2.41 |

*Comparative 1: corresponding to Comparative Example 1.

The results shown in Table 3, FIG. 1, and FIG. 2 indicated that $\Delta R_2$ increases (sensitivity increases) in proportion to dose.

The results shown in FIG. 1 indicated that the sensitivity increases in association with an increase in the amount of added N,N-bis(2-acrylamidoethyl)acrylamide (compound of Formula (1)) (Example 3: 1%, Example 4: 2%, Example 5: 3%, Example 6: 4%).

The results shown in FIG. 2 indicated that the radiation dosimeter containing N,N-bis(2-acrylamidoethyl)acrylamide (compound of Formula (1)) exhibits higher sensitivity than the radiation dosimeter of the Comparative Example containing N,N'-methylenebisacrylamide (Bis).

The invention claimed is:

1. A radiation dosimetry gel comprising a gelator, and a compound of the following Formula (1):

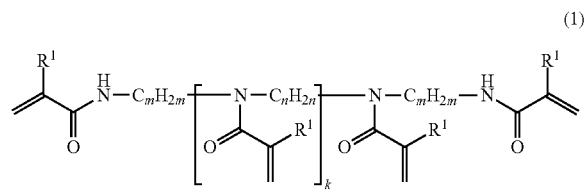

(wherein $R^1$ is a hydrogen atom or a methyl group;
m and n are each an integer of 2 to 4;
k is 0 or 1; and
a plurality of $R^1$s and ms are each the same as or different from one another).

2. The radiation dosimetry gel according to claim 1, wherein the radiation dosimetry gel further comprises water.

3. The radiation dosimetry gel according to claim 1, wherein the gelator is one or more selected from the group consisting of gelatin, agarose, xanthan gum, carrageenan, gellan gum, chitosan, and alginic acid.

4. The radiation dosimetry gel according to claim 1, wherein the gelator contains a water-soluble organic polymer (A) having an organic acid structure, an organic acid salt structure, or an organic acid anion structure, a silicate salt (B), and a dispersant (C) for the silicate salt.

5. The radiation dosimetry gel according to claim 4, wherein the water-soluble organic polymer (A) is a completely neutralized or partially neutralized polyacrylic acid salt having a weight average molecular weight of 1,000,000 to 10,000,000.

6. The radiation dosimetry gel according to claim 4, wherein the silicate salt (B) is particles of one or more water-swellable silicate salts selected from the group consisting of smectite, bentonite, vermiculite, and mica.

7. The radiation dosimetry gel according to claim 4, wherein the dispersant (C) is one or more selected from the group consisting of sodium orthophosphate, sodium pyrophosphate, sodium tripolyphosphate, sodium tetraphosphate, sodium hexametaphosphate, sodium polyphosphate, sodium etidronate, sodium poly(meth)acrylate, ammonium poly(meth)acrylate, a sodium acrylate/sodium maleate copolymer, an ammonium acrylate/ammonium maleate copolymer, sodium hydroxide, hydroxylamine, sodium carbonate, sodium silicate, polyethylene glycol, polypropylene glycol, sodium humate, and sodium ligninsulfonate.

8. The radiation dosimetry gel according to claim 1, wherein the radiation dosimetry gel further comprises a monomer capable of being polymerized by radiation exposure.

9. The radiation dosimetry gel according to claim 1, wherein the radiation dosimetry gel further comprises a deoxidizer.

10. A radiation dosimeter comprising, as a material for radiation dosimetry, the radiation dosimetry gel according to claim 1.

11. A radiation dosimetry method comprising a step of irradiating the radiation dosimeter according to claim 10 with a radiation.

12. A method for producing a radiation dosimetry gel, the method comprising a step of mixing the gelator specified in claim 1 and a compound of Formula (1).

* * * * *